US008155761B2

(12) United States Patent
Felts et al.

(10) Patent No.: US 8,155,761 B2
(45) Date of Patent: Apr. 10, 2012

(54) PROCESS CONTROL SYSTEM WITH INTEGRATED EXTERNAL DATA SOURCES

(75) Inventors: Christopher J. Felts, Austin, TX (US);
Mark J. Nixon, Round Rock, TX (US);
Neil J. Peterson, Austin, TX (US);
Cindy A. Scott, Georgetown, TX (US);
Terrence L. Blevins, Round Rock, TX (US);
Trevor D. Schleiss, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 445 days.

(21) Appl. No.: 12/508,343

(22) Filed: Jul. 23, 2009

(65) Prior Publication Data

US 2011/0022187 A1    Jan. 27, 2011

(51) Int. Cl.
*G05B 15/02* (2006.01)
*G05B 19/18* (2006.01)
*G05B 11/01* (2006.01)
*G05B 15/00* (2006.01)
*G06F 15/16* (2006.01)

(52) U.S. Cl. .......... 700/9; 700/17; 700/19; 700/83; 709/227; 709/228; 709/229

(58) Field of Classification Search .......... 700/9, 19; 709/227, 228, 229
See application file for complete search history.

(56) References Cited

U.S. PATENT DOCUMENTS

| 5,146,401 A | 9/1992 | Bansal et al. |
| 5,960,441 A | 9/1999 | Bland et al. |
| 6,421,571 B1 * | 7/2002 | Spriggs et al. ............ 700/17 |
| 6,658,491 B1 | 12/2003 | Hawkinson et al. |
| 6,728,262 B1 * | 4/2004 | Woram ............ 370/466 |
| 6,813,587 B2 | 11/2004 | McIntyre et al. |
| 6,944,631 B2 | 9/2005 | Peter |
| 6,970,771 B1 | 11/2005 | Preiss et al. |
| 7,120,558 B2 | 10/2006 | McIntyre et al. |

(Continued)

FOREIGN PATENT DOCUMENTS

EP    1 577 724 A2    9/2005

(Continued)

OTHER PUBLICATIONS

Search Report for Application No. GB1012223.2, dated Nov. 17, 2010.

*Primary Examiner* — Ronald Hartman, Jr.
(74) *Attorney, Agent, or Firm* — Marshall, Gerstein & Borun LLP

(57) ABSTRACT

Methods and systems for integrating external and/or enterprise data into a process control system are disclosed. A user interface may be provided to enable browsing and selection of a data item from an external and/or enterprise data source. The selected data item may be associated with a process control entity. At run time, independent of a configuration of the process control entity, an external data integration server or instance of an external data integration service at a process control computing device may periodically communicate with the data source to obtain an updated current value and updated current status for the selected data item for use by the process control entity. The external data integration server and/or external data integration service may consolidate access of external/enterprise data across process control entities, optimize communications with various data sources, and maintain a status of communication with each various data source.

26 Claims, 8 Drawing Sheets

U.S. PATENT DOCUMENTS

| | | |
|---|---|---|
| 7,185,014 B1 | 2/2007 | Hansen |
| 7,234,135 B2 | 6/2007 | Bollhoefer et al. |
| 7,266,428 B2 * | 9/2007 | Alexanian ............... 700/284 |
| 7,302,485 B2 | 11/2007 | Bauer et al. |
| 7,330,473 B1 | 2/2008 | Baier et al. |
| 7,496,911 B2 * | 2/2009 | Rowley et al. ............ 717/174 |
| 7,706,895 B2 * | 4/2010 | Callaghan ................. 700/17 |
| 7,774,251 B1 * | 8/2010 | Prasad et al. .............. 705/35 |
| 7,774,791 B1 * | 8/2010 | Appelbaum et al. ........ 719/318 |
| 2002/0116453 A1 | 8/2002 | Todorov et al. |
| 2002/0147503 A1 * | 10/2002 | Osburn, III ............... 700/9 |
| 2002/0178434 A1 | 11/2002 | Fox et al. |
| 2004/0162887 A1 | 8/2004 | Dillon et al. |
| 2004/0225745 A1 * | 11/2004 | Carroll et al. ............. 709/231 |
| 2005/0060408 A1 | 3/2005 | McIntyre et al. |
| 2006/0026193 A1 | 2/2006 | Hood |
| 2006/0130073 A1 | 6/2006 | Faist et al. |
| 2006/0133412 A1 | 6/2006 | Callaghan |
| 2006/0224361 A1 | 10/2006 | McIntyre et al. |
| 2007/0074280 A1 | 3/2007 | Callaghan |
| 2007/0198724 A1 | 8/2007 | Hawkinson et al. |
| 2007/0211079 A1 | 9/2007 | Nixon et al. |
| 2007/0280287 A1 | 12/2007 | Samudrala et al. |
| 2007/0282463 A1 | 12/2007 | Hodson et al. |
| 2008/0016466 A1 | 1/2008 | Grasser et al. |
| 2008/0028394 A1 | 1/2008 | Stich et al. |
| 2008/0028396 A1 | 1/2008 | Stich et al. |
| 2008/0082636 A1 | 4/2008 | Hofmann et al. |
| 2008/0082637 A1 | 4/2008 | Krainz et al. |
| 2008/0097622 A1 | 4/2008 | Forney et al. |
| 2008/0097626 A1 | 4/2008 | Reed et al. |
| 2008/0097947 A1 | 4/2008 | Stich et al. |
| 2008/0109098 A1 | 5/2008 | Moshier et al. |
| 2008/0320582 A1 * | 12/2008 | Chen et al. ............... 726/12 |
| 2009/0210814 A1 * | 8/2009 | Agrusa et al. ............. 715/772 |
| 2010/0222902 A1 * | 9/2010 | Eldridge et al. ........... 700/87 |
| 2010/0223629 A1 * | 9/2010 | Appelbaum et al. ........ 719/318 |

FOREIGN PATENT DOCUMENTS

| | | |
|---|---|---|
| GB | 2 354 785 A | 4/2001 |
| GB | 2 404 457 A | 2/2005 |
| GB | 2 443 288 A | 4/2008 |
| WO | WO-2007/124756 A2 | 11/2007 |

* cited by examiner

|       | Server Name     |     |     |      |
|-------|-----------------|-----|-----|------|
| 502 — | Web Service     |     |     |      |
| 505 — | Method          |     |     |      |
| 508 — | Parameters      | IN  | OUT | BOTH |
| 510 — | Parameter 1     |     |     |      |
|       | Parameter ...   |     |     |      |
|       | Parameter N     |     |     |      |
| 512 — | Result Parameter|     |     |      |

PROCESS CONTROL SYSTEM WITH INTEGRATED EXTERNAL DATA SOURCES

FIELD OF THE DISCLOSURE

The present disclosure generally relates to integration of data from external, third-party data sources and/or enterprise data sources into a process control system.

BACKGROUND

Process control systems, like those used in chemical, petroleum or other batch, continuous and/or hybrid processes, typically include one or more process controllers and input/output (I/O) devices communicatively coupled to at least one host or operator workstation and to one or more field devices via analog, digital or combined analog/digital busses. The field devices, which may be, for example, valves, valve positioners, switches and transmitters (e.g., temperature, pressure and flow rate sensors), perform functions within a process such as opening or closing valves and measuring process parameters. The process controllers receive signals indicative of process measurements made by the field devices and/or other information pertaining to the field devices, use this information to implement a control routine, and then generate control signals that are sent over the busses or other communication lines to the field devices to control the operation of the process. In this manner, the process controllers may execute and coordinate control strategies using the field devices via the busses and/or other communication links communicatively coupling the field devices.

Some process control systems require data from sources external to an enterprise of which the process control system is a part. Typically, but not necessarily, an external data source may be outside of a firewall of the process control system. For example, a specific process control system may need to obtain a current market value of a commodity from a stock market database, or the specific process control system may need to access external data from an OPC server for a particular device. Traditionally, configuring and integrating third-party or external data sources into a process control system is a separate, stand-alone exercise from configuring the process control system itself. Each workstation or controller requiring external or third-party data may require a separate configuration for each external or third-party data source.

Some process control systems require data from sources included in the enterprise of which the process control system is a part, but external to the process control system itself. Typically, but not necessarily, an enterprise data source may be outside of a firewall of the process control system. In one example, a given process control system may require enterprise data from another process control system owned or operated by the same parent company. In another example, the given process control system may need to access enterprise data stored on a server of a sub-contractor or other similar entity with which the owner or operator of the process control system has contracted to perform a task. Such enterprise data sources also must be configured into the process control system in a manner similar to external data sources, e.g., by using separate, stand-alone exercises. In some cases, an enterprise data source may also be an external data source.

With the multitude of workstations, controllers and external data sources associated with a process control plant, though, having separate configurations for each external and enterprise data source may quickly become cumbersome, costly and inconvenient. For example, the separate configurations may each require development and testing of supporting applications. The separate configuration applications may need to be maintained independently from the process control system and may introduce potential version compatibility issues. Moreover, the separate configurations for external and/or enterprise data sources may be stored in separate databases, thus requiring extra cost, time and resources for additional database administration and maintenance. Additionally, if new external or enterprise data is required by the process control system after configuration, adding the new external or enterprise data may result in potential disruption of existing data transfer.

SUMMARY OF THE DISCLOSURE

In accordance with one aspect of the disclosure, an external/enterprise data source integration system (EDIS) for use in a process control system is described. The EDIS may service external data, enterprise data or both external and enterprise data. The external/enterprise data source integration system may include an external data integration server accessible by one or more process control computing devices in communication with the process control system, and an external data integration service resident on the one or more process control computing devices. The external data integration server and each instance of the external data integration service may serve as a consolidated location where various process control computing devices may request external and/or enterprise data. The external data integration server and each instance of the external data integration service may be enabled to establish communications with external and/or enterprise data sources, receive current values and current statuses of data items from the external and/or enterprise sources, and provide the current values and statuses to process control entities in the process control system. The external and/or enterprise data items may include real-time, historical, transactional, or other types of data.

In a preferred embodiment, the external data integration server may be active and the instances of the external data integration service may be dormant. If the external data integration server becomes unavailable, one or more instances of the external data integration service may become active. Process control entities requiring external and/or enterprise data may then interface with an instance of the external data integration service on their respective process control computing device or with an instance of the external data integration service on any available process control computing device to obtain current values of data items.

In accordance with another aspect of the disclosure, embodiments of a method for integrating data into a process control system is disclosed. The method may allow a user to select an external or enterprise data source and a data item provided by the external or enterprise data source. The selected data item may be desired for use with a process control entity. During run-time, a current value and other information for the selected data item may be received, maintained, and provided to the process control entity. A use of the current value may be based on a current corresponding status of the external or enterprise data source and/or a communications status between the external or enterprise data source and the process control system.

In accordance with yet another aspect of the disclosure, embodiments of a method of integrating external data into a process control system is described. The method may provide an external data integration server and an instance of an external data integration service on a workstation of the process control system. The method may receive a request from a process control entity for a current external data value from an external or enterprise data source, retrieve the current external data value from the external data integration server or from the instance of the external data integration service, and provide the current external data value to the process control entity. The external data integration server and the instance of the external data integration service may communicate with the external data source to obtain an updated external data value and an updated status. The communication may occur independently of any interaction with or direction from the requesting process control entity.

BRIEF DESCRIPTION OF THE DRAWINGS

FIG. 5 is an example of a form in a process control system that may be used to populate configuration characteristics for a web service that provides external and/or enterprise data to the process control system.

DETAILED DESCRIPTION

Figure 1A:
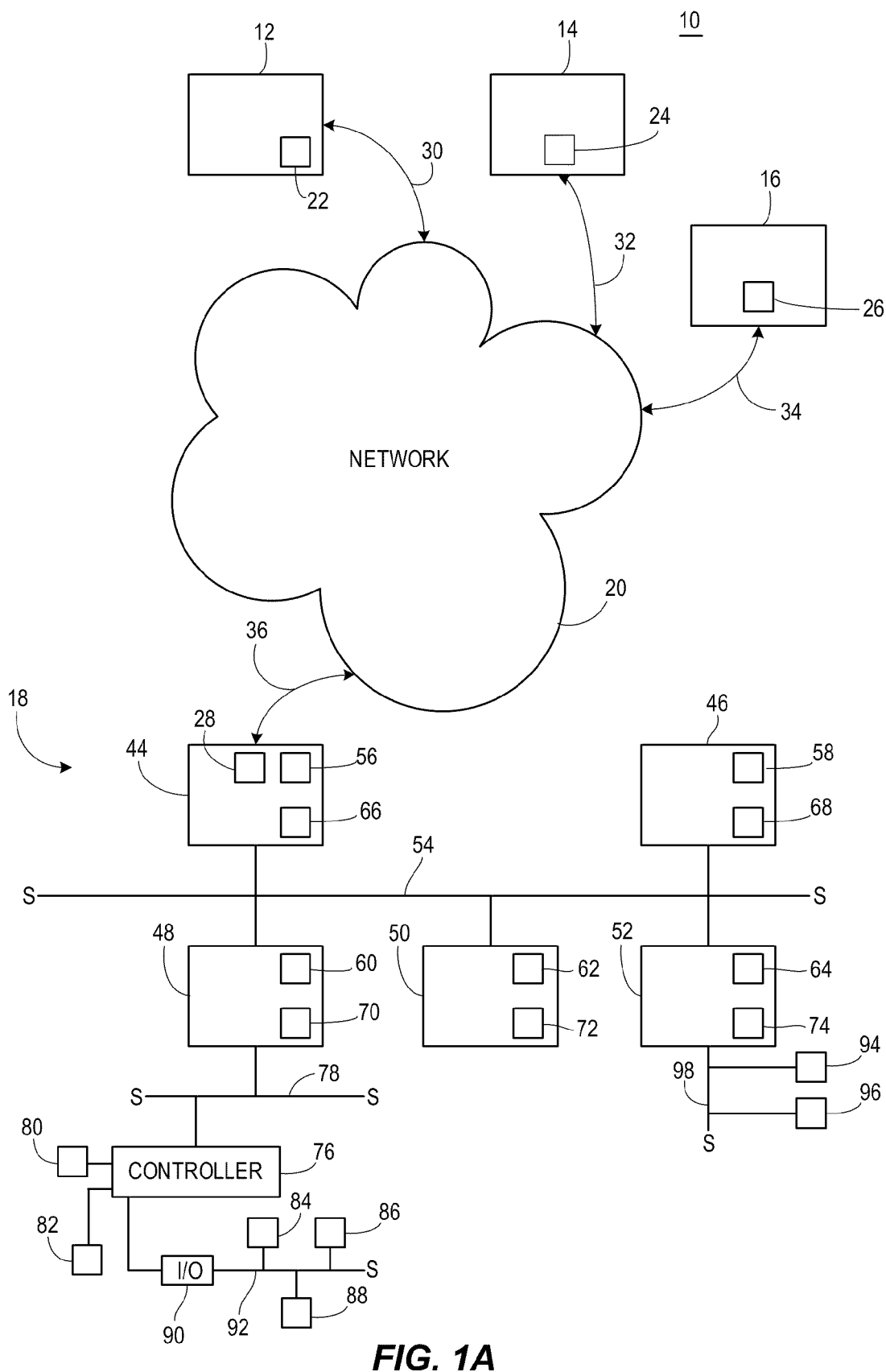
FIG. 1A is an exemplary block diagram of an enterprise system including a process control system and other enterprise data sources.

FIG. 1A is an exemplary block diagram of an enterprise system 10 including a plurality of enterprise data sources 12, 14, 16 and 18 that may be communicatively coupled via a network 20. The network 20 may be a public network, a private network or a combination of public and private network(s). With respect to the plurality of enterprise data sources 12, 14, 16 and 18, the network 20 may be local, remote or a combination of local and remote network(s). Each of the enterprise data sources 12-18 may include a respective network interface 22, 24, 26 and 28, that may enable the enterprise data sources 12-18 to communicate with each other (and/or with other data sources or services communicatively coupled to the network 20) via the network 20 using respective communication links 30, 32, 34 and 36. Each of the communication links 30, 32, 34 and 36 may be a wired or wireless communication link. Indeed, each of the communication links 30, 32, 34 and 36 may use any known or desired networking technology.

The enterprise system 10 depicted in FIG. 1A may be associated with a particular business entity or a portion or portions of a particular business entity. Alternatively, the enterprise system 10 may be associated with a plurality of business entities, which may be related by, for example, a common business goal or arrangement. In any event, the enterprise data sources 12-18 (and other elements or constituents of the enterprise system 10, some of which are not shown for purposes of clarity) of the enterprise system 10 may be geographically distributed. For example, some of the enterprise data sources 12-18 may be located within a single physical plant or campus, while other ones of the enterprise data sources 12-18 may be remotely geographically located such as, for example, in different states or countries.

Each of the enterprise data sources 12-18 may include one or more applications, systems, services, etc. For example, the enterprise data sources 12-18 may be any desired combination of process control systems, financial or business management systems, manufacturing systems, maintenance systems, diagnostic systems, etc., all of which preferably, but which do not necessarily, include information pertaining to (or which may be useful in controlling and/or assessing) process control activities within the enterprise system 10. Each of the enterprise data sources 12-18 may be implemented using a personal computer, a workstation, a hand-held computing device, a server, a peer node, or any other suitable computer system or processor capable of executing one or more software routines stored in a memory or other data storage device associated therewith. In addition, each of the enterprise data sources 12-18 may include one or more applications that perform functions such as, for example, communication functions, accounting functions, manufacturing functions, maintenance functions, optimization functions, monitoring functions, process control functions, etc. Each of the enterprise data sources 12-18 may also include an operator terminal, keyboard, display and/or any other user interfaces (none of which are shown) that may enable a user to receive information from and to enter information into the data source.

By way of example only, the enterprise data source 18 is depicted as a process control system or plant. As shown in FIG. 1A, the enterprise data source, process control system or plant 18 may include a plurality of workstations or computer systems 44, 46, 48, 50 and 52, all of which may be communicatively coupled via a system level network or data bus 54. The network or data bus 54 may be implemented using any desired media and data transmission protocol. For example, the data bus 54 may be implemented using an Ethernet-based configuration. However, any other suitable data bus or network media and data transmission protocol may be used instead.

The computer systems 44-52 may include respective processors 56, 58, 60, 62 and 64 and memories 66, 68, 70, 72 and 74. One or more software routines may be stored within each of the memories 66-74 and may be executed by the one of the processors 56-64 associated therewith to perform one or more functions. For example, when executed, the software routines may perform asset management or optimization functions, process control functions, equipment and process monitoring functions, communication functions (e.g., paging, email, etc.), accounting functions, maintenance functions, campaign management functions, diagnostic functions, data historian functions, etc.

As shown by way of example in FIG. 1A, the workstation or computer system 48 is configured to perform process control functions or activities. In particular, the computer system 48 may be communicatively coupled to a controller 76 via a data bus 78. The controller 76 may be, for example, be a DeltaV™ controller commercially available from Fisher Rosemount Systems, Inc. of Austin, Tex. However, any other suitable controller could be used instead. A plurality of field devices 80, 82, 84, 86 and 88 may be communicatively coupled to the controller 76, either directly as depicted with the devices 80 and 82 or via an input/output device 90 and data bus 92 as depicted with the devices 84-88. In general, the field devices 80-88 may be sensors, actuators, or any other devices that may be used within a process control system to monitor and/or control the operations thereof. Furthermore, some of the field devices 80-88, such as the devices 80 and 82, may be non-smart field devices that communicate with the controller 76 using analog or two-state electrical signals such as, for example, 4-20 milliampere (mA), 0-10 volts direct current (VDC), dry contact outputs or inputs, etc. Still further, other ones of the field devices 80-88, such as the devices 84-88, may be smart field devices such as, for example, foundation Fieldbus devices, HART devices, etc., all of which are well known and, thus, need not be described in greater detail herein.

The computer system 52 may be, for example, a monitoring or diagnostic system that is coupled to a plurality of devices 94 and 96 via a communication link 98, which may be, for example, a data bus or any other suitable communication link. In particular, the devices 94 and 96 may be rotating equipment such as, for example, electric generators that supply power to the various systems within the process control plant 18. The remaining computer systems 44, 46 and 50 may perform any desired functions, including, for example, diagnostic functions, data historian functions, asset management functions, communication functions, etc. and may exchange information or data within the process control plant 18 via the data bus 54 and within the enterprise system 10 via the interface 28, the communication link 36 and the network 20.

Figure 1B:
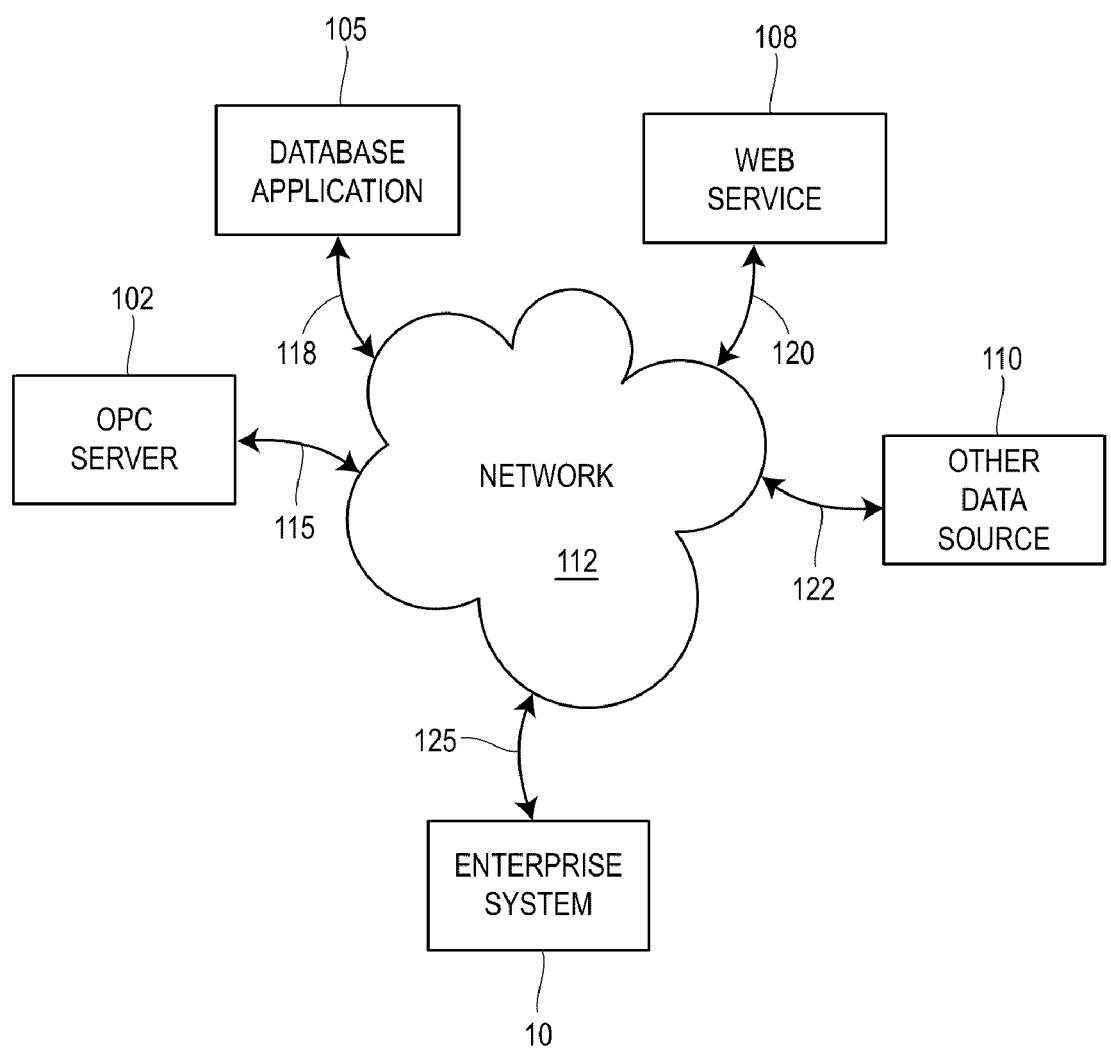
FIG. 1B illustrates an exemplary block diagram of the enterprise system of FIG. 1A in communication with external data sources.

FIG. 1B illustrates an exemplary block diagram of the enterprise system 10 of FIG. 1A coupled to a plurality of external data sources 102, 105, 108 and 110, each of which is in communication with the enterprise system 10 via a network 112. As used herein, the terms "external data source" and "third-party data source" are used interchangeably to mean a source of data that is external to an enterprise. An "enterprise data source" is meant to be a source of data that is included in the enterprise of which a particular system is a part, but external to the particular system itself. Typically, but not necessarily, an external data source and an enterprise data source may be outside of a firewall of the particular system. For example, for a given commercial, for-profit enterprise, a database administered by a federal government may be considered to be an external data source while a human resources server that includes a personnel database for the commercial, for-profit enterprise may be considered to be an enterprise data source but not an external source. In some instances, however, an enterprise data source may also be an external data source, such as when the aforementioned personnel database is administered by a separated business entity with which the given, commercial, for-profit enterprise has a contract for services.

In FIG. 1B, one or more portions of the network 112 may be the same as the network 20 of FIG. 1A, or the network 112 may be a different network altogether. The network 112 may be a public network, a private network, or a combination of public and private network(s). The network 112 may be a local network, a remote network, or a combination of local and remote network(s). Each external data source 102, 105, 108 and 110 may be coupled to the network 112 via a communication link (illustrated by references 115, 118, 120 and 122 respectively). Each of the communication links 115, 118, 120 and 122 may be a wired or a wireless link, and each of the communication links 115, 118, 120 and 122 may employ any known networking technology. Each of the external data sources 102, 105, 108 and 110 may be implemented using a personal computer, a workstation, a hand-held computing device, a server, a peer node or any other suitable computer system or processor capable of executing one or more software routines stored in a memory or other data storage device associated therewith.

The enterprise system 10 may be in communication with the network 112, for example, via a communication link 125. The communication link may be a wired or a wireless link, and the communication link 125 may employ any known networking technology. In one example, the communication link 125 may be the same as the communication link 36 shown in FIG. 1A.

The external data source 102 may represent, for example, one or more OPC servers that may communicate with the enterprise system 10 over the communication link 115 and the network 112. Examples of possible OPC servers 102 include DA (Data Access), A&E (Alarms and Events), HDA (Historical Data Access) and other available OPC interfaces. The enterprise system 10 and the process control system 18 may interface with the one or more OPC servers 102 to read and write device data for various applications.

The external data source 105 may represent, for example, a database application or a database management system executing on one or more other computing devices, such as database applications/management systems supported by Open Database Connectivity (ODBC) standards, Oracle, and the like. The database application 105 may be accessed by the enterprise system 10 via, for example, an SQL query sent over the communication link 118. Data and related information received from the database application or the database management system 105 may be used to support process control activities in the enterprise system 10 and in the process control system 18. In another example, the external data source 105 may represent another type of database, such as a relational database or a historian database.

The external data source 108 may represent, for example, one or more web services hosted on one or more website servers, peer-to-peer nodes or other type of web-hosting system. In one example, the enterprise system 10 may use the communication link 120 for SOA (Service-Oriented Architecture) structured web service method calls to business systems such as SAP, LIMS (Laboratory Information Systems), MIMS (Municipal Infrastructure Management Systems), and the like. Similarly, the enterprise system 10 may receive data from the structured web services 108 to incorporate into process control activities.

Other data sources 110 external to but in communication 122 with the enterprise 10 may be possible. Data sources 102, 105, 108, 110 may provide real-time data, or may additionally or alternatively provide other types of data such as historical or transactional data. Examples of other data sources 110 may include other websites, RSS feeds, and the like. Of course, the number and types of external data sources illustrated by FIG. 1B are exemplary. In some embodiments, only one external data source may be in communication with the enterprise system 10. In some embodiments, a subset of the external data sources 102, 105, 108 and 110 may be in communication with the enterprise system 10, or more than four types of external data sources may be in communication with the enterprise system 10. Any number of any type of external data source(s) may be used in conjunction with the present disclosure.

Secure data transfer between the data sources 102, 105, 108, 110 and the enterprise system 10 may be provided. For example, one or more computing devices of the enterprise system 10 may be a secure computing device, and/or the communications link 125 to the enterprise system 10 may be secured. Security of the computing devices in the enterprise system 10 and/or of the communications link 125 may be effected by any known security means and mechanisms.

Figure 2A:
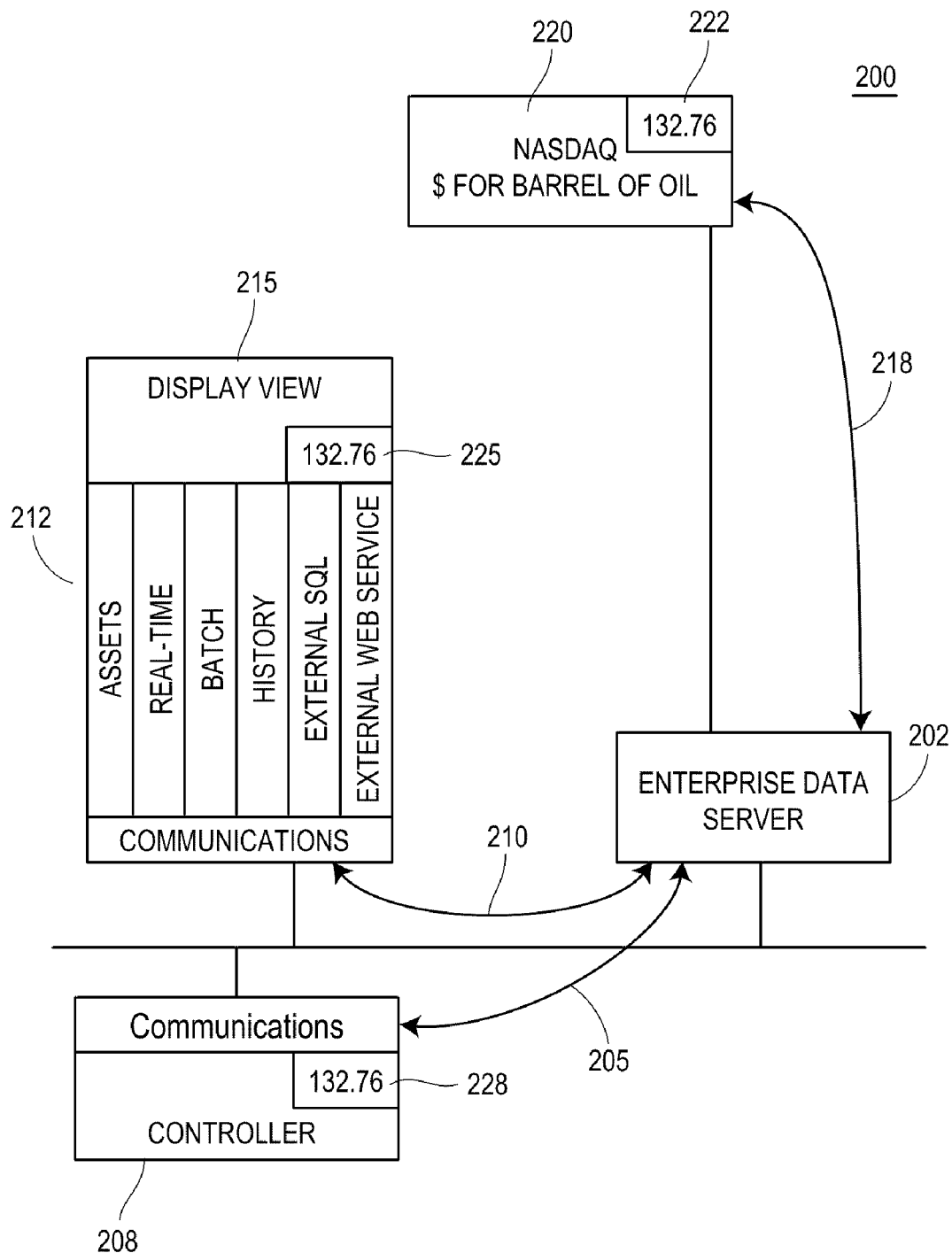
FIG. 2A illustrates an embodiment of an external/enterprise data integration system (EDIS) in a process control system.

FIG. 2A illustrates an embodiment of an external/enterprise data integration system (EDIS) 200 for use in a process control system of a process control plant, such as the process control system 18 in the enterprise system 10 of FIG. 1A. The external/enterprise data integration system 200 may serve as a single point of access for controllers, operator work stations and other process control system computing devices associated with a process control system to access external, third-party data and/or enterprise data. If a given process control system computing device requires interfacing with one or more external or enterprise data sources to perform an activity, the given process control computing device may simply interact with the EDIS 200 to obtain any needed data values and data information, even if the needed data values and information must be obtained from multiple, different external and/or enterprise data sources.

The benefits of the external/enterprise data integration system 200 are numerous. First, each controller, operator work station or other process control computing device in a process control system is no longer required to communicate in a pair-wise manner with different external and enterprise data sources. Custom interface software does not need to be developed, tested, integrated and maintained to enable data access between each process computing device and external or enterprise data source pair. Furthermore, each process control computing device may be freed from having to individually maintain administrative software for handling atypical situations pertaining to the external or enterprise data source, such as when a communication link is inoperable or when the external/enterprise data source incurs an upgrade.

Another benefit that the EDIS 200 provides is an elimination of separate configurations for each different external and/or enterprise data source. The EDIS 200 may provide "out-of-the-box" data access to external and/or enterprise data sources without any additional configuration required. Memory may be saved, as a different configuration file for each different external and/or enterprise data sources is not required at each process control computing device. Time may also be saved, as an operator or other process plant personnel is not required to perform a separate configuration exercise for each different external and/or enterprise data source at each different process control computing device.

Additionally, the external/enterprise data integration system 200 may provide added system efficiencies. For example, instead of multiple different process controller computing entities each having to request a particular piece of data from a particular external or enterprise source, the EDIS 200 may consolidate the multiple requests into a single request to the particular external or enterprise data source. Message traffic between the process control system and the particular external data source may thus be reduced. In another example, when the particular external data source changes versions, a single update at the EDIS 200 may quickly ensure version compatibility throughout the entire process control system in a timely manner. Accordingly, the use of the EDIS 200 thus may decrease potential incompatibility issues as the EDIS 200 eliminates the "delayed ripple effect" of version change information to each and every affected process control computing device in the process control system.

Moreover, the external/enterprise data integration system 200 may provide added operator efficiencies. As the EDIS 200 is integrated into a process control system, a process control operator, engineer or other personnel may easily browse for external and/or enterprise data using a familiar process control system browser interface. The operator may then be able to conveniently select, obtain and incorporate external and/or enterprise data into HMI (Human Machine Interface) presentations, control strategies, function blocks, and the like. Also, as previously discussed, the operator may be freed from configuring each and every process control computing device with each external and/or enterprise data source. In particular, the operator may be freed from creating separate modules and parameters in order to land external and/or enterprise data.

Furthermore, the EDIS 200 may provide a single location for administering a communication status of an external or enterprise data source. With the EDIS 200, instead of multiple controllers sounding multiple warnings and alarms when communications with a particular OPC server deteriorate, the EDIS 200 in the process control system (i.e., a single entity) may indicate the warning and alarm. Thus, alarm and warning traffic within the process control system may be reduced. Multiple, redundant warnings and alarm for the same communication incident may be eliminated, thus focusing the information provided to an operator and leading to greater efficiency in his or her response time and actions.

Turning again to FIG. 2A, the external/enterprise data integration system 200 may include an enterprise data server 202 in communication via a link 205 with one or more controllers 208 within the process control system. The enterprise data server 202 may also be in communication via a link 210 with one or more workstations or process control computing devices 212 in communication with the process control system. The workstation or computing device 212 may be enabled to execute a process control function that may include internal process control system information such as assets, real-time data, batch, historical data, etc. Additionally or alternatively, the process control functions may require the inclusion of information external to the process control system, such as SQL, web services, OPC information, and the like. In the example illustrated by FIG. 2A, the process control function is shown as a display view 215. However, other process control functions such as control loops, maintenance, and operator-initiated functions, to name a few, may require integration of external or enterprise data.

The enterprise data server 202 may also be in communication via a link 218 with a data source 220 containing data of interest to some process control entity in the process control system. The data source 220 may represent, for example, one or more external data sources external to an enterprise including the process control system, and/or one or more enterprise data sources internal to the enterprise but external to the process control system itself. To protect data transfer, the enterprise data server 202 and/or the communications link 218 may be secured using any known means of security, such as password protection, encryption, keys, authorizations, and the like.

The EDIS 200 may be incorporated into embodiments of the enterprise system 10 of FIGS. 1A and 1B. In just one of many possible illustrative examples, if the EDIS 200 is used in conjunction with the process control system 18 of FIGS. 1A and 1B, the controller 208 in FIG. 2A may be the controller 76 of FIG. 1A. The workstation or computing device 212 of FIG. 2A may be one of the computing devices 44, 46, 48, 50 or 52 of FIG. 1A, the enterprise data server 202 may be in communication with the controller 76 and the computing devices 44, 46, 48, 50 and 52 via the data bus 54 and/or via the network 20, and so on. The data source 220 may be, for example, one or more of the external data sources 102-110 illustrated in FIG. 1B. Alternatively or additionally, the data source 220 may be an enterprise data source, such as one or more of the enterprise data sources 12, 14, and 16 illustrated in FIG. 1A. For clarity's sake, the following description of FIG. 2A will refer to the data source 220 as an external data source, however, as previously discussed, the data source 220 of FIG. 2A may represent one or more external data sources and/or one or more enterprise data sources.

In the embodiment illustrated in FIG. 2A, the enterprise data server 202 is enabled to communicate via the link 218 with the data source 220. Other process control system controllers 208 and process control computing devices 212 do not communicate directly with the data source 220, but instead may communicate (references 205 and 210, respectively) with the enterprise data server 202 in order to access information from the data source 220.

Although only one enterprise data server 202 is illustrated in FIG. 2A, multiple physical enterprise data servers in the EDIS 200 are possible. In some embodiments having multiple physical enterprise data servers, the multiple physical enterprise data servers may behave as a single logical entity, i.e., a single logical enterprise data server 202. In other embodiments, the single logical enterprise data server 202 may be partially or entirely partitioned across more than one physical entity. For example, an enterprise data server A may administer external data integration with a first set of third-party data sources, an enterprise data server B may administer external data integration with a second, different set of third-party data sources, and an enterprise data server C may administer data integration with enterprise data sources.

The enterprise data server 202 may be local to the process control system, or one or more portions of the enterprise data server 202 may be accessed remotely, for example, on an external side of a process control system firewall. The enterprise data server 202 may be a secure server, with which communications may be protected by using password protection, encryption, user authorization, and/or other known security means.

When a particular external data value is desired for use in the process control system, a requesting party in the process control system (e.g., a requesting process control computing entity 212, a requesting controller 208, etc.) may request the particular external data value from the enterprise data server 202. The particular external data value may be desired, for example, to use in alarms, for historical purposes, for scaling and other calculations, for use in control strategies or function blocks, for display on an HMI presentation, and/or for use in other process control system functions or activities.

To obtain the requested particular external data value, the enterprise data server 202 may dynamically establish and maintain communications via the link 218 with the data source 220, obtain the particular external data value, and provide the particular external data value to the requesting party. In some (but not necessarily all) cases, licenses, permissions or agreements between the owner or operating entity of the enterprise data server 202 and the owner or operating entity of the data source 220 must be established before electronic communications between the two computing entities (references 202, 220) may take place.

If the requesting party is a process control computing entity 212, the obtained particular data value may be maintained locally at the process control computing entity 212 in a corresponding external data object 225. The corresponding external data object 225 may have a type and a value. In one example, the type may identify a type of the data source 220 (e.g., OPC, database, web service, RSS feed, or other type), and the value may be populated with a current value for the obtained particular external data. The current value may be periodically updated or refreshed via communications received by the enterprise data server 202 from the data source 220. When the obtained particular external data is no longer needed by the process control computing entity 212, the local record (e.g., the external data object) of the obtained particular external data object or contents thereof 225 may be deleted, stored in another location, or otherwise retired and communications with the data source 220 may be discontinued.

If the requesting party is a requesting controller 208, the obtained particular data value may be maintained locally at the requesting controller 208 in a corresponding local instance of an external data object 228, in a manner similar to that described for the process control computing entity 212.

Consider the specific example illustrated in FIG. 2A. In FIG. 2A, a process control system computing device 212 may have a need for an external data value (i.e., a market value of a barrel of oil) for use in a operator display routine or display view 215. The market value of a barrel of oil may be maintained (reference 222) by a third party data source 220 external to the enterprise of the process control system, namely, a NASDAQ server or database manager 220. The requesting process control computing device 212 may send a request for the market value of a barrel of oil via the communication link 210 to the enterprise data server 202 associated with the process control system. The enterprise data server 202 may establish communications 218 with the NASDAQ database manager 220, obtain a current market value of a barrel of oil (in this example, the value $132.76), and may communicate the obtained current market value of a barrel of oil to the computing device 212. The computing device 212 may locally store the obtained current value in an external data object (reference 225) and may incorporate the current market value of a barrel of oil as needed into the display view 215. Additionally, the stored current value 225 may be available for incorporation into other display views or process control activities or functions executed by the computing device 212. As the current data value 222 changes at the NASDAQ database manager 220, the enterprise data server 202 may receive updates and may inform the computing device 212 of any changes so that the locally stored current value 225 maintains an up-to-date value for the current market value of a barrel of oil.

Of course, when a request for the external data value is received at the enterprise data server 202 and the external data value has been previously requested by a different requesting party and stored in the EDIS 200, the enterprise data server 202 may retrieve a stored local copy and may communicate the external data value directly to the requesting party without communicating with the third-party data server 220. The enterprise data server 202 may be responsible for ensuring that the stored local copy of the external data value is consistent with the actual value 222 at the NASDAQ database manager 220.

Similarly, in the specific example of FIG. 2A, if the controller 208 has a need for the current market value of a barrel of oil, such as for use in a control function block or control loop, the controller 208 may request the current market value of a barrel of oil from the enterprise data server 202. The enterprise data server 202 may communicate 218 with the NASDAQ database manager 220, may obtain the current market value, and may deliver the obtained current market value via the communication link 205 to the controller 208. The controller 208, like the computing device 212, may maintain a local copy of the obtained data value in a local instance of an external data object 228, and may update the value of the local copy 228 as updates to the value are received via the enterprise data server 202. The locally stored data value 228 may be available for incorporation into any process control activity performed by the controller 208.

As the enterprise data server 202 may serve as a single point of access between the process control system and the external data source 220, the enterprise data server 202 may optimize communications with the external data source 220 when multiple requests of a particular external data source 220 from multiple process control entities are received at the enterprise data server 202. For example, if both the controller 208 and the computing device 212 desire the current market value of a barrel of oil, the enterprise data server 202 may consolidate both requests into a single communication exchange with the NASDAQ server 220.

In some embodiments of the external/enterprise data integration system 200, in addition to or instead of the local copy of the current data value being maintained by the requester of the data value (e.g., as illustrated by the references 225 and 228), a local copy of an obtained data value may be maintained at the enterprise data server 202 itself, such as in an instance of an external data object at the server 202 (not pictured). Whether the local copy of the data value is maintained by the enterprise data server 202, by one or more requesters in the process control system, and/or by both the enterprise data server 202 and the one or more requestors, the enterprise data server 202 may be ultimately responsible for ensuring a consistency between all various local copies of the data value maintained throughout the process control system.

External data objects 225, 228 may have classes, similar to other process control objects. For example, an external data object may correspond to a class of data sources, such as "other process control systems owned/operated by the same company" or "OPC server type ZZ." Each child of the external data object 225, 228 may accordingly correspond to a specific identity or instance of the class.

The EDIS 200 may be responsible for maintaining and providing a status of the data value 222. The status of the data value 222 may indicate a quality of communication between the process control system and the data source 220, e.g., "good," "normal," "intermittent," "unavailable," and the like. Additionally or alternatively, the status of the data value 222 may indicate a quality or state of the data value 222 and/or the data source 220 itself, such as an indication if the external data source 220 is operating normally, intermittently available, or unavailable. The status for the data value 222 may be received directly from the data source 220, may be determined by the EDIS 200, or may be based on a combination of the two.

The status of the external data value 222 may be stored in the external data object 225, 228, and may indicate a measure or level of confidence of a validity or quality of the current data value stored in the external data object 225, 228. For example, if the status stored in the external data object 225, 228 is indicated as "GOOD," a user or requesting process control entity may have a high level of confidence that the corresponding data value in the external data object 225, 228 is valid. If the status corresponding to the external item stored in the external data object 225, 228 is indicated as "UNAVAILABLE," the user may then interpret the corresponding data value to be incorrect, stale, suspect or invalid, and may accordingly choose alternative strategies. The effect of the status on a specific data value may be automatically incorporated into display views and/or other process control activities or functions so operators and/or applications may easily distinguish potentially suspect third-party data values and take appropriate action.

Alternatively or additionally, a status of an external data source 220 may be maintained outside of external data objects 225, 228, such as in a global or local database (not shown) in the process control system. Irrespective of where the status is maintained, the enterprise data server 202 may be responsible for updating the status throughout the process control system. Changes to the status may be reflected by, for example, errors, flags, alarms, warnings of potentially invalid data, and the like.

The EDIS 200 may shield the process control system from transitory communication issues. For example, the EDIS 200 may incorporate some level of hysteresis (based on time, error rate, and/or some other measure) while monitoring the communications to and from a given data source over a given communication link. A status may remain set to "GOOD" or "NORMAL" unless the hysteresis level is exceeded. The level of hysteresis may be set based on user input and may vary for each data source, each communication link, each group of data sources, and/or each group of communication links.

Figure 2B:
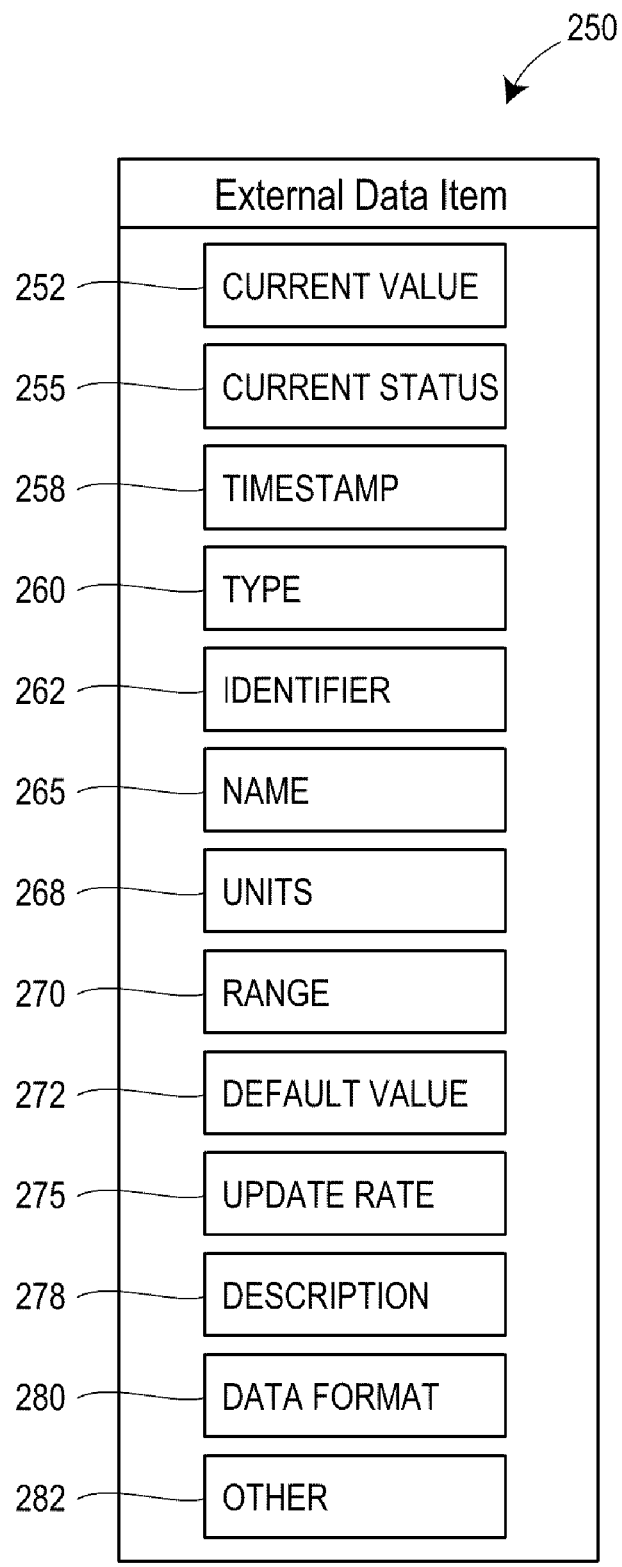
FIG. 2B illustrates an embodiment of an external data object in the EDIS of FIG. 2A.

FIG. 2B illustrates an embodiment of an instance of an external data object 250 in the external/enterprise data integration system (EDIS) 200 of FIG. 2A, such as the external data object 225, the external data object 228, or an external data object at the enterprise data server 202 (not pictured). The external data object 250 may correspond to an external data item, such as the external data item 222 of FIG. 2A. As previously discussed, the external data object 250 may include a current value 252 and a current status 255 for the external data item, each of which may be periodically updated, for example, in an automatic fashion when the hysteresis level is exceeded.

Additionally, the external data object 250 may include one or more attributes corresponding to the external data item. For example, the external data object 250 may include a timestamp 258 indicating when the current value 252 or the current status 255 was last updated. In embodiments where the current value 252 and the current status 255 are updated simultaneously, a single timestamp 258 may be stored. In some embodiments, separate timestamps 258 for the current value 252 and the current status 255 may be possible.

The external data object 250 may include an indication of a type 260 of data source of the external data item, such as an indication of an OPC server, a database server, a web service provider, a web site, an RSS feed, another computing device, or other type of external data source. The external data object 250 may include a unique identifier 262 of the external data source, such as a network or IP address, a peer-to-peer endpoint name, or the like. The external data object 250 may include an optional name 265 or user-friendly name of the external data source, such as a tag.

The external data object 250 may include an indication of units 268 of the external data item, e.g., gallons, dollars, degrees, flow rate, tons, etc. The external data object 250 may include an indication of a range 270 during which the current value 252 of the external data item is to be considered valid, such as a time interval range or a numerical range. The external data object 250 may include a default or alternate value 272 for the external data item. The default or alternate value 272 may be used for redundancy purposes, for example, when the current status 255 indicates that the current value 252 may be suspect, or when an update to the current value 252 has not been received within an expected time window specified by an update rate 275. The current value 252 and the current status 255 may each be associated with the same or different update rates 275.

The external data object 250 may include a description of the external data item 278, such as at least one of a textual or pictorial description. The external data object 250 may include a data format attribute 280 of the external data item. The data format 280 may indicate a structure of data of the current value 252, such as an XML (Extensible Mark-Up Language) schema, an EDDL (Electronic Device Description Language) script, a float, an integer, a Boolean representation, a decimal, or some other known data format. The data format 280 may indicate that the external data format may be received in a data chunk, such as a string, a matrix or a tabular format. Other attributes of the external data item 282 may be additionally or alternatively included in the external data object 250.

Some or all of the attributes 252-282 of the external data item may be displayable. Some or all of the attributes 252-282 may be updated in the external data object 250, either by a communication received from the external data source and/or by an entity within the process control system itself, such as a script, a control function, or a user. Separate access controls for reads and writes of some or all of the attributes 252-282 may be provided.

With the external data object 250, a requesting entity within the process control system (such as the control system computing device 212 or the process controller 208 of FIG. 2A) may easily integrate an external data item value into a process control function in numerous ways. For example, some pre- or post-processing of one or more attributes of the external data item may be performed by an associated script, and then the pre- or post-processed data may be incorporated into a process control function. An illustrative example of such a script may be one that converts a current value of external data item from units provided by the external data source into units required by the process control function. A pre-processing version of this example script may obtain an updated value from the external data source and perform unit conversion before storing the updated value into the external data object. A post-processing version of this example script may operate on an untouched, stored updated value stored in the external data object, and may convert the updated value into units required by the process control function prior to providing the updated value to the process control function. Of course, other scripts providing other pre- or post-processing functions are possible.

Another example of integrating the external data item into the process control system may include intelligent integration of the external data. Consider the example of an external data source that provides lab data to the process control system. The external data source may periodically send volumes of updated lab data, but the process control system or requesting entity therein may want to intelligently integrate only select data points of the volumes of updated lab data. For example, the requesting entity may desire to use only lab data in conjunction with an event. In this example, the external data item may be associated with an event handler in the process control system, and the value of the current data item may be used only when the event occurs.

In another example, the requesting entity may mine the volumes of updated lab data for values that are considered to be valid or useful only during a specified range of time. Accordingly, the requesting entity may determine if the external data item is valid via the timestamp 258 or the range 270 in the external data object 250, and may only retrieve current values received within the specified range of validity. In yet another example, the requesting entity may time-shift a current external data item value 252 using the timestamp 258 and an offset to align the current value 252 to other time-sensitive objects used by the process control function. Of course, these examples are illustrative only and not meant to limit the possible ways of intelligently integrating external data into the process control system.

Figure 3:
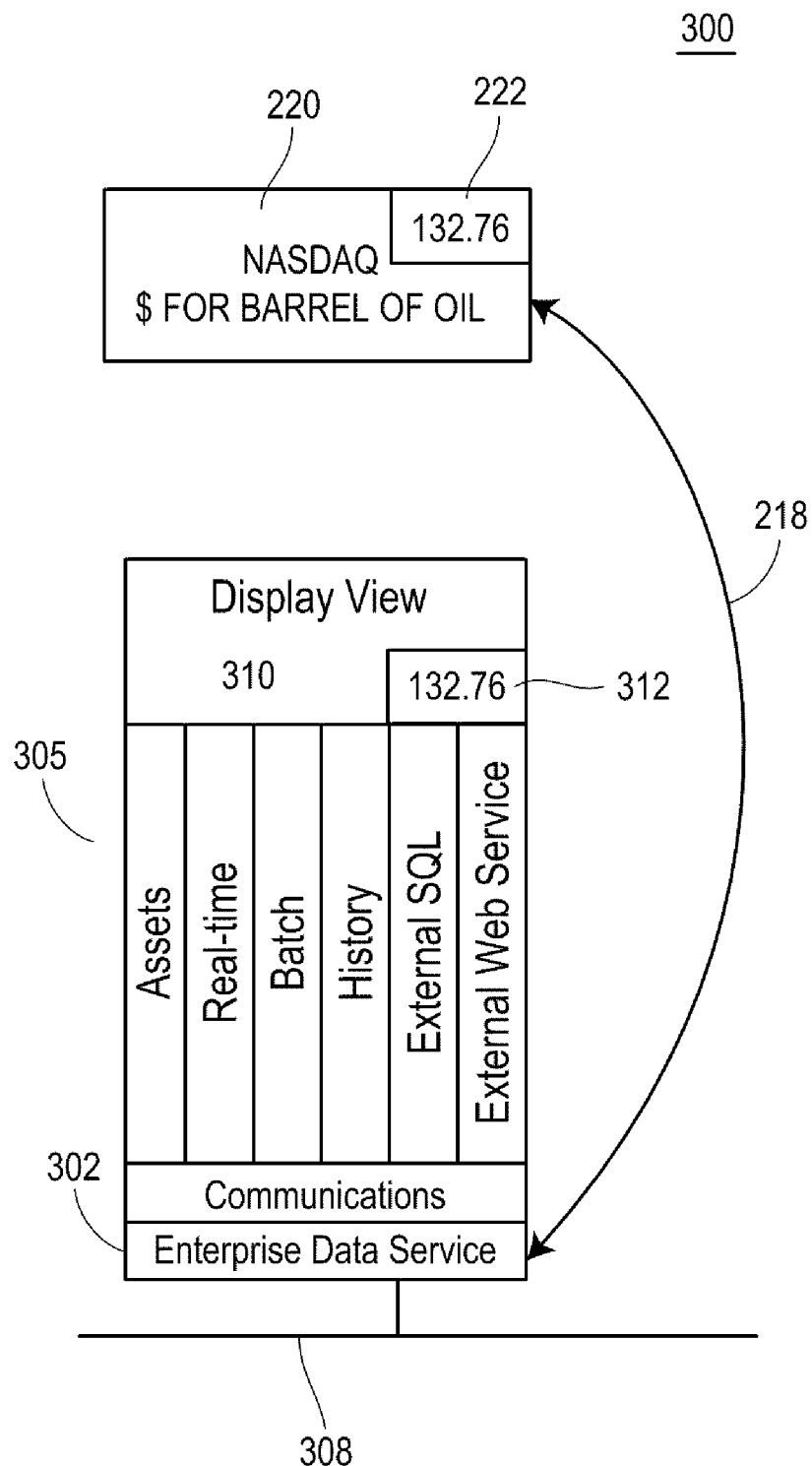
FIG. 3 depicts another embodiment of an external/enterprise data integration system (EDIS) in a process control system.

FIG. 3 depicts another embodiment of an external/enterprise data integration system (EDIS) 300 for use in a process control system of a process control plant. The EDIS 300 may operate in conjunction with the enterprise system 10 of FIGS. 1A and 1B, as well as in conjunction with the external/enterprise data integration system 200 illustrated in FIG. 2A and the external data object 250 of FIG. 2B, if desired.

In FIG. 3, the external/enterprise data integration system 300 may behave in a fashion similar to that of the EDIS 200 of FIG. 2A, however, instead of having a single logical instance of an enterprise data server 202, the EDIS 300 may have a local instance or layer of the enterprise data service (reference 302) on one or more workstations or process control computing devices 305 in communication with the process control system. The process control computing device 305 may communicate with other entities in the process control system via a bus 308, such as the bus 54 illustrated in FIG. 1A.

Thus, in FIG. 3, if a particular workstation 305 requires a particular external data value to incorporate into a display view 310, control strategy or other process control activity or function, the particular workstation 305 may request the particular external data value from the local enterprise data service layer 302. The local layer 302 may dynamically establish and maintain communications over the communications link 218 with the data source 220 (in a manner similar to that previously discussed for FIG. 2A), including maintaining a communication status. The local layer 302 may obtain the particular external data value 222, and provide the particular external data value to the requesting workstation 305. The obtained particular data value may be maintained locally in a corresponding external data object 312 at the workstation 305, and the value may be incorporated into the display view 310 or into any other process control activity or function executed by the workstation 305. A status of communications and/or of the data source 220 and one or more other attributes corresponding to the data value may also be stored in the external data object 312, and may influence a usage of the current data value. The locally stored data value 312 may be periodically updated or refreshed via communications (reference 218) received by the local enterprise data system layer 302 from the data source 220. When the obtained particular external data is no longer needed by the workstation 305, the local record 312 of the obtained particular external data may be cleared, deleted, stored in another location, or otherwise retired and communications (reference 218) with the data source 220 may be discontinued.

The embodiment 300 of the external/enterprise data integration system in FIG. 3 differs from the embodiment 200 of FIG. 2A as instances of the embodiment 300 may be distributed across workstations or process control computing devices in some or all portions of the process control plant. However, although the data integration functionality 302 may be distributed across multiple workstations, the data integration layer 302 may still insulate each workstation itself from having to modify existing software to configure, administer and manage multiple communication interfaces with multiple external and/or enterprise devices. Each separate instance of the EDIS 300 on each separate workstation may be identical and may be coordinated across the each separate workstations. The coordination across multiple workstations provides redundancy advantages. For example, if a particular workstation is unavailable, data integration messages may be routed to other available workstations having instances of the external/enterprise data integration system 300.

In some embodiments, the "centralized" EDIS 200 of FIG. 2A and the "distributed" EDIS 300 of FIG. 3 may operate together in a coordinated manner in the process control system. Both the centralized system 200 and the distributed system 300 may be operational "out-of-the-box," however, the centralized system 200 may normally provide data integration functionality and the distributed system 300 may normally be inactive. In some embodiments, the centralized system 200 may reside outside of the process control system firewall with a secure interface to the distributed system 300 residing within the process control system firewall.

If the enterprise data server 202 becomes unavailable, each process control computing device may revert to using an instance of the local distributed system 300 to seamlessly continue data integration with external and/or enterprise data sources, typically the instance resident thereon. Controllers may also change to using a particular instance of the local distributed system 300. Likewise, if a specific instance of a local distributed system 300 becomes unavailable, then communications destined for the specific instance may be re-routed and processed by another, available instance of the local distributed system 300 on another workstation or computing entity, or may be routed to the enterprise data server 200.

Figure 4:
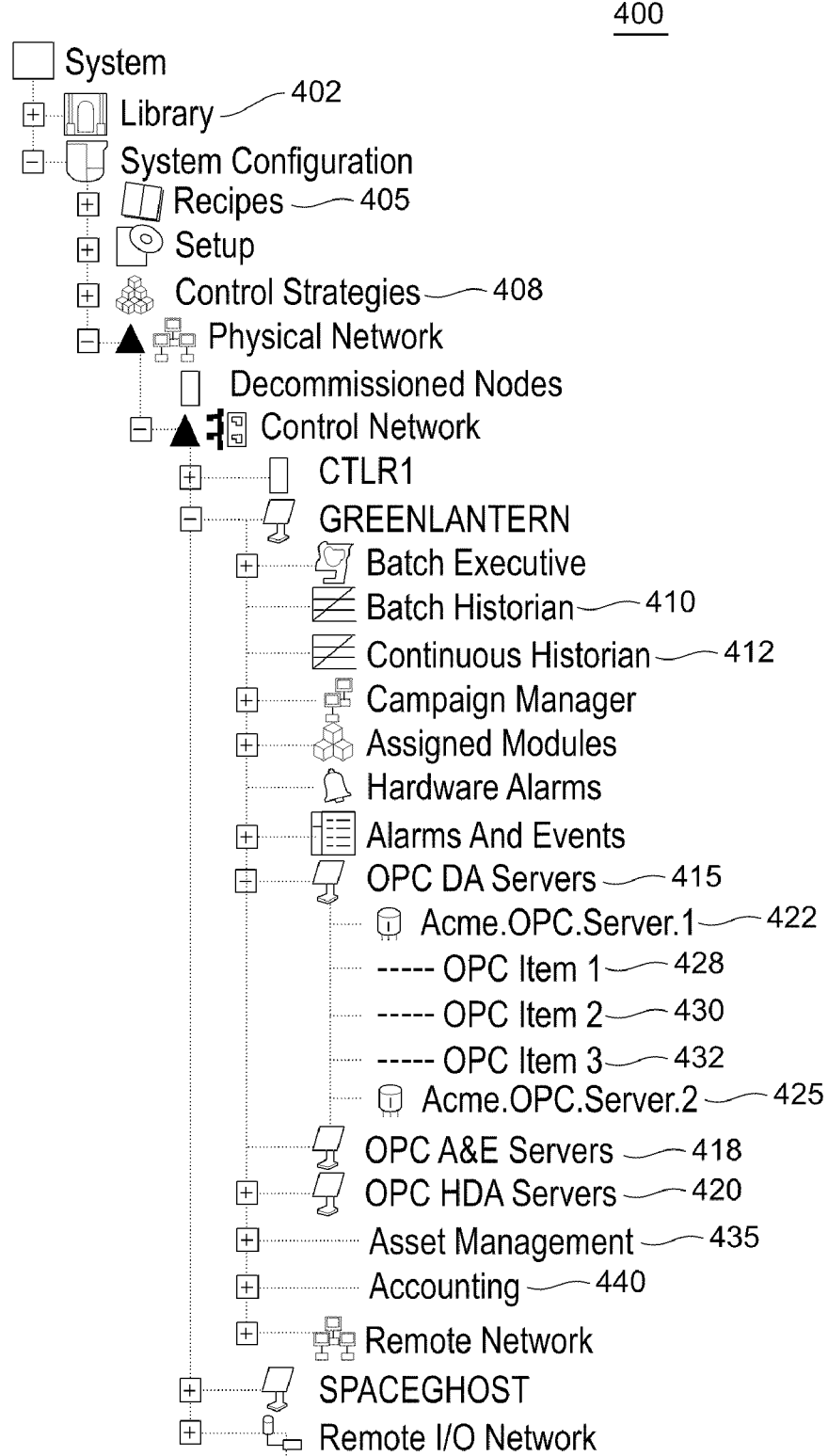
FIG. 4 is an exemplary screen shot of a browser window in a process control system displaying integrated external and enterprise data sources.

FIG. 4 is an exemplary screen shot of a browser window 400 in a process control system displaying integrated external and enterprise data sources. FIG. 4 may be used in conjunction with embodiments of FIGS. 1-3. In FIG. 4, the screen shot 400 shows standard available locations and nested locations within the process control system that are able to be browsed, such as a library 402, batch recipes 405, control strategies 408, historians (references 410 and 412) and the like.

Additionally, integrated external and/or enterprise data sources that are able to be browsed may also be included in the browser window 400, and may be represented by headings and/or sub-headings as desired. In FIG. 4, OPC DA Servers are represented by one icon 415, OPC A&E Servers are represented by another icon 418, and OPC HDA Servers are represented by yet another icon 420. In the illustrated instance of the browser window 400, the OPC DA Servers 415 has been selected and the visible menu has expanded to display sub-headings Acme.OPC.Server.1 and Acme.OPC.Server.2, respectively represented by references 422 and 425. Acme.OPC.Server.1 422 has been selected, and the menu has been further expanded to display corresponding OPC data objects OPC Item 1, OPC Item 2, and OPC Item 3 (references 428, 430 and 432, respectively). A user may be able to select one of the indicated available OPC data objects 428-432 and incorporate the corresponding data value into a display view, a control strategy or other process control activity by using a drop-down menu command, a drag and drop, mouse or keyboard sequences, and the like. Typically (but not necessarily), the browsing, selecting and incorporation of the selected data object may be performed by the user while he or she is configuring the display view, the control strategy, or some other process control activity.

Enterprise data sources that may be browsed for potential data integration may also displayed and integrated into the browser view 400. For example, in the browser window 400, an asset management server/system is shown at reference 435 and an accounting server/system is shown at reference 440. Similar to the external data sources, if a given enterprise data source representation is selected on the browser window 400, sub-elements may be displayed. If a given sub-element is selected, further corresponding sub-elements may displayed, and so on, until a level including data items is displayed for selection. In some embodiments, a status corresponding to the data item and/or to the data source may be displayed. For example, the status may be represented by a different font color (e.g., red, yellow, green) or font attribute (e.g., italics, bold, flashing, etc.), or the status may be represented by some other separate indicator such as text, a flag, an icon, or the like.

Of course, any number of external data sources and/or enterprise data sources may be displayed on the browser window 400. The external and/or enterprise data sources may be automatically discovered and added to the browser window 400. For example, a Web service such as the UDDI (Universal Discovery Description and Integration) interface may be used to automatically discover and add indications of Web services to the browser window 400. For external data that may not have the ability to be automatically discovered, or as a default procedure, corresponding external and/or enterprise data sources may be manually added to the browser window 400, such as by selecting an available network computing device and an associated data source.

The representation of the external and/or enterprise data sources may be congruent with browser representations that are already in use in the process control system, and expansion of a selected icon or representation to display sub-categories may similarly behave accordingly. In a preferred embodiment, on a display screen, the actual server machine names or identifications may be hidden from the user and instead, a meaningful logical name may be used (e.g., text strings "ACME.server.1" (reference 422), "OPC HDA Servers" (reference 420), etc.).

In other embodiments, the browse dialog may not use a tree format as illustrated by FIG. 4, but may instead use other formats to help the user find a desired external or enterprise data object. For example, the user may be able to interact with a search dialog box (not shown). The search dialog box may first request the user to select a Source Type, such as OPC, SQL, Web Service, or other available external and/or enterprise data source types. The selection of a given Source Type may determine other parameters that may be subsequently presented to the user to help narrow the user's search.

For a selected Source Type of OPC, for example, the user may be presented with available networked computing devices. Upon selection of an available networked computing device, the user may be presented with available OPC servers associated with the selected available networked computing device. Upon selection of an available OPC server, the user may then be presented with a typical OPC browser interface to locate the desired object.

For a selected Source Type of SQL, for example, the user may be presented with available networked computing devices. Upon selection of an available networked computing device, the user may be presented with available SQL databases resident on the selected available networked computing device, and, upon selection of an available SQL database, the user may be presented with the available stored procedures for the selected available SQL database.

For a selected Source Type of Web Service, for example, the user may be presented with available networked computing devices. Upon selection of an available networked computing device, the user may be presented with available web services associated with the selected available networked computing device. Upon selection of an available web service, the user may then be presented with available web methods from the selected web service.

Once a desired external or enterprise data object has been selected, the corresponding data value associated with the selected external or enterprise data object may need to be characterized so that the process control system may be able to properly incorporate the corresponding data value. Possible characterizations for the data value may include the source type, a source name, a numerical representation or data type of the value (e.g., float, integer, number of place values, etc.), a number or size of the value (e.g., for a scalar, a vector, a matrix, etc.), a representation of quality (in particular as applied to OPC data values but may also apply to other data types), and/or an update or refresh rate for the data value. Other characteristics or characterizations may also be possible. Not every external or enterprise data value will require all of the above listed characterizations.

Note that the update or refresh rate for a particular data value or group of data values may correspond to a status of a data source and/or corresponding communication link. For example, if a refresh rate is set to a certain value and the data value has not been refreshed for a period of time longer than the expected refresh rate, then the status of the data source and/or communication link associated with the particular data value may change to "NOT AVAILABLE" (or equivalent).

A form may be provided to populate characteristics of an external or enterprise data value so that the external or enterprise data value may be easily integrated into the process control system. One such example is illustrated by a form 500 shown in FIG. 5. The form 500 illustrated in the example shown by FIG. 5 may be used to integrate a web service data value into the process control system, and may be used in conjunction with any embodiments of FIGS. 1-4. The form 500 may include fields such as a server name 502, a web service identifier 505, a method 508, and any number of parameters 510. A result parameter field 512 may also be provided for an output from the web service. Other fields (not shown) may also be provided. Some or all of the fields 502-510 may be automatically populated, or a user may manually populate some or all of the fields 502-510. A different form may be provided as desired for each external and/or enterprise data source, data source type, or particular data value.

Figure 6:
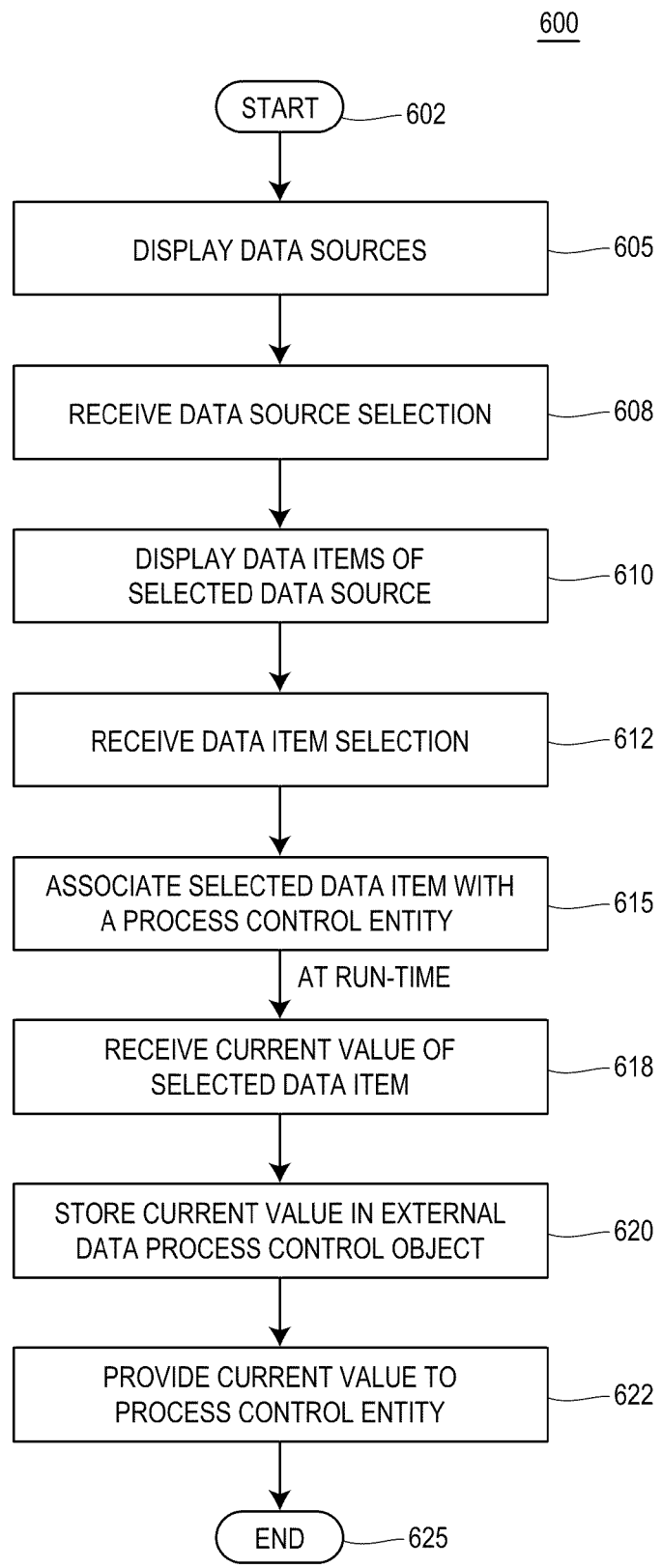
FIG. 6 is an exemplary method of integrating external and/or enterprise data into a process control system.

FIG. 6 illustrates an exemplary method 600 of integrating external and/or enterprise data into a process control system. Embodiments of FIG. 6 may be used in conjunction with any embodiments of any of FIGS. 1-5, if desired.

At the start 602 of the method 600, available data sources (external, enterprise, or both) from which the process control system may receive data for integration may be displayed (block 605). As previously discussed, the available data sources may be, for example, part of an enterprise to which the process control system belongs, and/or the data sources may be entirely external to the enterprise to which the process control system belongs. The available data sources may be displayed on a browser or other user interface of the process control system. For instance, a browser such as shown in FIG. 4 may be used to perform the block 605 and other portions of the method 600.

At block 608, a selection of a data source from the displayed available data sources may be received. Examples of selection methods and mechanisms are commonly known and may include, for example, a mouse or touch-screen click, a keyboard sequence, a drag-and-drop operation, and the like. Any known method or mechanism of receiving a selection may operate in conjunction with the block 608, and indeed, with the present disclosure.

Upon receipt of the indication of the selected available data source at the block 608, data items of the selected data source available for integration into the process control system may be displayed for selection (block 610). In some embodiments, such as in the example of the OPC DA Servers representation 415 of FIG. 4, if multiple levels of sub-elements are present, the blocks 608 and 610 may be repeated until a level including available data items is displayed.

At block 612, a selection of a data item from the displayed available data items may be received in a manner similar to that used in the block 608.

At block 615, the selected data item may be associated with a process control entity. The process control entity may be, as previously discussed, a display view, a control strategy, a function block or the like, and the selected data item may be incorporated therein. In some embodiments, the blocks 605-615 may be executed during a configuration procedure of the process control entity, such as when a control strategy incorporates the selected external/enterprise item into a control loop. In other embodiments, if the process control entity is able to be changed in real-time without reconfiguration, the selected data item may be associated with the process control entity accordingly. For example, if the process control entity is a knowledge document that includes a dynamic hyperlink to a data item included in a governmental database, the block 615 may associate the selected representation of the data item included in the governmental database with the process control object corresponding to the knowledge document.

At some time thereafter during run-time, blocks 618-622 of the method 600 may occur. At the block 618, a current value of the selected data item may be received from the selected data source. The current value may be stored (the block 620) in an external data object. The external data object may be a particular type of process control object in the process control system for maintaining and administrating integrated external/enterprise data, such as the external data object 250 illustrated in FIG. 2B. The external data object may include the current value and the current status of the selected data item. The external data object may optionally also include other fields, such as attributes of the data item, e.g., data source type, data format, data units, a refresh or update rate, a default value, a range, and other fields. In some embodiments, the external data object may be a class object.

At the block 622, the current value of the selected data item may be provided to the process entity. Thus, during run-time, the method 600 may continuously provide an updated value of the selected data item to the process control entity without requiring a re-configuration or without requiring the process control entity to have maintain and execute an interface with the data source.

Finally, at block 625, the method 600 may end. Note that in some embodiments, only the blocks 605-612 of the method 600 may be executed for informational purposes, such as to provide information to a user or process plant personnel. In these embodiments, the method 600 may end (the block 625) immediately after the execution of the block 612.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Although the present disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A process control system for use in controlling a process control plant using external data, the process control plant including a process controller coupled to control a plurality of field devices, the process control system comprising:
   a process control entity configured to perform, during run-time of at least a portion of the process control plant, a process control function that uses both an internal data item generated by a computing device inside of a firewall of the process control system and an external data item generated by a computing device outside of the firewall;
   an external data object communicatively coupled to the process control entity and having a memory that stores a current value and a current status of the external data item used by the process control entity; and
   an external data integration entity including at least one of an external data integration service on a same computing device as the process control entity or an external data integration server,
   wherein the external data integration entity is:
      communicatively coupled to the process control entity, the external data object and an external data source,
      configured to access the external data object, and
      configured to, during run-time of the at least the portion of the process control plant periodically receive an updated value and an updated status of the external data item from the external data source, and update the current
   value and the current status of the external data item in the external data object to the updated value and the updated status, and
   wherein the process control function is enabled to, during run-time and based on a most recently updated status of the external data item, use a most recently updated value of the external data item.

2. The process control system of claim 1, wherein at least one of:
   the process control entity is one of: a operator display routine, a control module, a function block, or a maintenance routine;
   the process control entity is configured for one of a workstation, the process controller, or one of the plurality of field devices;
   the process control function is one of: a control loop function, a maintenance function, an operator-initiated function, or a display function; or
   the external data source is one of: an OPC server, a database server, a web service provider, a web site, an RSS feed, or another computing device.

3. The process control system of claim 1, wherein the external data integration entity includes both the external data integration server and the external data integration service, and wherein the external data integration server is further configured to maintain consistency of the current value and the current status of the external data item between the external data object and a local instance of the external data object at the external data integration service.

4. The process control system of claim 1, wherein the external data integration entity is further configured to consolidate multiple requests for a particular external data item into a single communication instance with the external data source, the multiple requests originating from more than one process control entity.

5. The process control system of claim 1, wherein, during run-time and based on the most recently updated status of the external data item, more than one process control entity is enabled to use the most recently updated value of the external data item.

6. The process control system of claim 1, wherein the external data integration service comprises an instance of the external data integration service and a separate local instance of the external data object on each of a plurality of computing devices in the process control system, and wherein if one of the plurality of computing devices is unavailable, an available computing device receives a communication from the external data source originally destined for the unavailable computing device.

7. The process control system of claim 1, wherein the external data integration entity includes both the external data integration server and the external data integration service, and wherein when the external data integration server is available, the external data integration service is in a stand-by mode, and when the external data integration server becomes unavailable, the external data integration service enters an active mode.

8. The process control system of claim 1, wherein:
   the external data integration entity includes both the external data integration server and one or more external data integration services on one or more computing devices,
   the one or more external data integration services are inside of the firewall,
   the external data integration server is outside of the firewall, and
   the external data integration server is configured to consolidate delivery of the external data item to the one or more external data integration services.

9. The process control system of claim 1, wherein:
   the memory of the external data object further includes at least one attribute corresponding to the current value of the external data item, the at least one attribute selected from: a timestamp, a type of the external data source, a unique identifier, a name or tag, a type of numerical representation units, a range, a default value, a description, an indication of a data format, or an update rate; and
   the process control function is enabled to use the most recently updated value of the external data item based on the most recently updated status and at least one of the at least one attribute.

10. The process control system of claim 1, further comprising at least one of:
    a script for at least one of pre-processing or post-processing the external data item;
    an association of the external data item with an event handler;
    an alternate value of the external data item;
    a separate access control for at least one of a read or a write of at least a portion of the memory of the external data object;

an indication of a range of time during which the current value of the external data item is valid; and a time-shifted current value of the external data item.

11. The process control system of claim 1, further including a search mechanism, the search mechanism configured to display a selectable list of external data sources and a selectable list of external data items corresponding to a selected external data source from the selectable list of external data sources; and wherein the process control entity is configured to use a selected external data item from the selectable list of external data items.

12. The process control system of claim 11, wherein the selectable list of external data sources includes at least one automatically discovered external data source.

13. A method of integrating external data into a process control system controlling a process plant, the process plant including a process controller coupled to control a plurality of field devices, comprising:

displaying, for user selection, an indication of a data source, the data source outside of a firewall of the process control system;

upon a user selection of the data source, displaying, for user selection, an indication of at least one data item of the data source;

after receiving an indication of a user selection of one of the at least one data item, configuring a process control entity in the process control system to perform, during run-time of at least a portion of the process plant, a process control function that uses a current value of the selected data item; and during run-time of the at least the portion of the process plant:

periodically receiving an updated value of the selected data item from the data source, updating, in a memory of an external data object communicatively coupled to the process control entity, the current value of the selected data item to the updated value;

updating, in the memory of the external data object, a current status of the selected data item to an updated status, and performing, based on the current status of the selected data item by the process control entity, the process control function using the current value of the selected data item from the external data object.

14. The method of claim 13, wherein:

configuring the process control entity comprises configuring one of a operator display routine, a function block, a maintenance routine, or a control module;

performing the process control function comprises performing one of a control loop function, a maintenance function, an operator-initiated function, or a display function using the current value of the selected data item; and displaying the indication of the data source comprises displaying an indication of one of: an OPC server, a database application, a database server, a web service provider, a web site, an RSS feed, or a computing device.

15. The method of claim 13, further comprising determining the updated status of the selected data item by at least one of: receiving an indication of the updated status from the data source, or determining a status of communication between the process control system and the data source.

16. The method of claim 13, further comprising modifying the current status of the selected data item when a subsequent updated value for the selected data item is not received within an update time window.

17. The method of claim 13, further comprising displaying the current status of the selected data item based on a hysteresis level.

18. The method of claim 13, further comprising storing at least one attribute of the selected data item in the memory of the external data object, the at least one attribute selected from: a timestamp, a type of the data source, a unique identifier, a name or tag, a type of numerical representation units, a range, a default value, a description, an indication of a data format, or an update rate: and wherein performing the process control function using the current value of the selected data item comprises performing, based on at least one of the at least one attribute, the process control function using the current value of the selected data item.

19. The method of claim 13, further comprising associating the selected data item with at least one of:

a script, the script being at least one of a pre-processing or a post-processing script; or an event handler.

20. The method of claim 13, further comprising determining a data format of the current value.

21. The method of claim 20, wherein determining the data format of the current value comprises determining the data format of the current value to be one of: XML (Extensible Mark-Up Language), EDDL (Electronic Device Description Language), a float, an integer, a string, a matrix, a table, or a Boolean representation of data.

22. The method of claim 13, wherein performing the process control function using the current value of the selected data item comprises at least one of:

performing the process control function using the current value of the selected data item during a time range during which the current value of the selected data item is defined to be valid;

performing the process control function using a time-shifted current value of the selected data item; or determining an alternate current value for the selected data item and performing the process control function using the alternate current value.

23. A method of integrating external data into a process control system controlling a process plant, the process plant including a process controller coupled to control a plurality of field devices, comprising:

configuring a process control entity in the process control system to perform, during run-time of at least a portion of the process plant, a process control function that uses both an internal data item generated by a computing device inside of a firewall of the process control system and an external data item from an external data source outside the firewall of the process control system;

communicatively coupling an external data object in the process control system with the process control entity, the external data object storing a current value, a current status, and at least one attribute of the external data item in a memory;

communicatively coupling an external data integration entity to the process control entity, the external data object, and the external data source, the external data integration entity being at least one of an external data integration server in the process control system or an external data integration service on a same computing device as the process control entity; and at run-time of the at least the portion of the process plant:

periodically receiving, at the external data integration entity from the external data source, an updated value and an updated status of the external data item, updating the current value of the external data item in the external data object to the updated value, updating the current status of the external data item in the external data object to the updated status, and performing, by the process control entity based on the current status and one of the at least one attribute of the external data item, the process control function using the current value.

24. The method of claim 23, wherein:

communicatively coupling the external data integration server with the external data source outside the firewall comprises communicatively coupling the external data integration server with one of: an OPC server, a database application, a database server, a web service provider, a web site, an RSS feed, or another computing device;

configuring the process control entity comprises configuring the process control entity to run on a workstation, the process controller or one of the plurality of field devices;

configuring the process control entity comprises configuring at least one of: a operator display routine, a control module, a maintenance routine, or a function block; and storing the at least one attribute of the external data item comprises storing at least one of: a timestamp, a type of the external data source, a unique identifier, a name or tag, a type of numerical representation units, a range, a default value, a description, an indication of a data format, or an update rate.

25. The method of claim 23, further comprising displaying at least one of:

at least one of a list of current values or a list of current statuses of external data items of the external data source, wherein each member of the list of current values is currently integrated into the process control system;

a list of process control entities currently configured to use a current value of any external data item of the external data source;

a list of process control functions currently using any external data item from the external data source; or a list of available external data sources.

26. The method of claim 23, further comprising at least one of:

associating the external data item with at least one of a pre-processing or post-processing script;

associating the external data item with an event handler;

determining an alternate value of the external data item;

providing a separate access control for at least one of a read or a write of the external data object;

time-shifting of the current value of the external data item for use in the process control function; and determining a range of time during which the current value is valid.

* * * * *